EXTENSION DISK SUPPORT FOR DISK HARROW GANGS

Filed July 8, 1965

Inventor
Owen P. Hixon
By [illegible]
Attorney

United States Patent Office 3,370,653

Patented Feb. 27, 1968

3,370,653

EXTENSION DISK SUPPORT FOR DISK HARROW GANGS

Owen P. Hixon, Onalaska, Wis., assignor to Allis-Chalmers Manufacturing Company, Milwaukee, Wis.

Filed July 8, 1965, Ser. No. 470,477
4 Claims. (Cl. 172—599)

Figure 1:
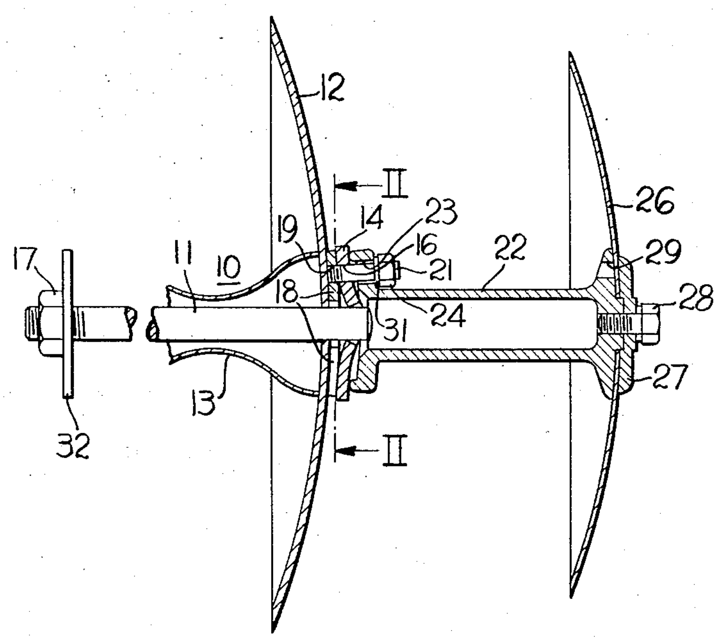

This invention relates to tandem disk harrows and more particularly to an extension disk at the outer ends of the rear disk gangs.

When operating a tandem disk harrow, the end disks of the rear gangs form an objectionable furrow, and it is well known in the art to employ a smaller diameter disk in spaced relation from the outer ends of the rear disk gangs to fill in the end furrows and leave the ground smooth and level. However, in the known prior art, the means for attaching the extension disk to the outer ends of the rear disk gangs have been inadequate for one or more of the following reasons:

(1) Insufficient strength with repairs being costly and time consuming;
(2) Undesirable size and/or projections which cause excessive trash accumulation;
(3) High manufacturing cost; and
(4) Difficult and time consuming to attach and detach from a disk gang.

Accordingly, the principal object of this invention is to eliminate the foregoing difficulties by providing a simple, compact and relatively inexpensive means for connecting an extension disk to a disk harrow gang.

A further object of the present invention is to provide a strong and rigid disk connection which can be easily and quickly mounted, dismounted or repaired without requiring disassembly of the disk harrow gang.

Figure 2:
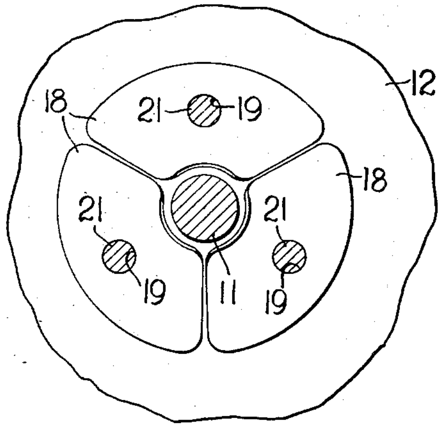

Referring now to the drawings in which:

FIG. 1 is a side elevation in section of the end disk of a gang with an extension disk attached thereto; and FIG. 2 is a section view taken on line II—II of FIG. 1.

A conventional disk gang 10 is rigidly secured together by means of a gang bolt 11. In FIG. 1, only one, the outer disk 12, of the gang is shown, however, gang 10 is made up of a series of disks spaced apart by spacing spools 13 and all rigidly secured by gang bolt 11. The outer end of the gang bolt has a hub washer 14 rigidly secured thereto by any suitable means such as welding. The hub washer has three equally spaced openings 16 which receive a spanner wrench to prevent axial turning of gang bolt 11 when nut 17 is tightened on the other end of bolt 11 for rigidly securing the disks and spools together to form a unitary structure. The structure so far is conventional in a disk harrow gang, and if further information relative thereto is desired, reference may be made to U.S. 2,974,738 which shows in greater detail this conventional type of construction.

Three identical arcuate shaped washer segments 18 are positioned between hub washer 14 and the end harrow disk 12. Each washer segment 18 is provided with a threaded opening 19 which aligns with the openings 16 in the hub washer 14. Studs 21 are threaded into the segments so as to extend outwardly through the openings 16 in the hub washer 14. An extension spacing spool 22 is rigidly secured to the end of gang bolt 11 by means of studs 21. The studs are received through openings 23 in the inner flange of spool 22 and the connection is secured by nuts 24 threaded to studs 21. A smaller diameter extension disk 26 is fixed to the outer end of spacing spool 22 by means of washer 27 and a central cap screw 28. The outer end of spacing spool 22 is provided with openings 29 to receive a spanner wrench when the extension disk is being installed initially. It is to be noted that washer segments 18 are so configured as to present a surface contacting disk 12 which surface is complementary to the disk surface contacted and the segments also present a surface in contact with washer 14 which surfaces are complementary to the surface of washer 14 being contacted. It also should be noted that the three segments provide a substantially unbroken surface about their periphery thus eliminating trash accumulation; this being accomplished by having each segment occupy approximately 120° of space about the axis of bolt 11, as can be seen in FIG. 2. The radial extent of the segments from the axis of bolt 11 is slightly less than the washer 14, thus providing very little space in which trash can accumulate. Referring to FIG. 1, it is seen that with the extension in operative position, the extension provides as much ground clearance as is provided by standard washers and spools.

The method of attaching the extension disk to a disk harrow gang is as follows:

The gang bolt 11 is loosened sufficiently to allow washer segments 18 to be inserted behind the hub washer 14 and in front of the outboard disk 12 until the threaded opening 19 in each segment 18 is in alignment with an opening 16 in the washer 14. Studs 21 are then threaded into the segments with the studs projecting through the openings 16 in the washer 14. The spacing spool 22 is then securely attached to washer 14 by the studs 21 being received in openings 23 in spool 22 and by nuts 24 being tightened down on studs and interposed washers 31. A spanner wrench is then engaged in holes 29 in the opposite end of spool 22, thus keeping bolt 11 from turning. Nut 17 on the inner end of gang bolt 11 is then drawn up against washer 32 until the gang is rigidly united. Extension disk 26 is then attached to spool 22 by means of a cap screw 28 which is threadably received by the outboard end portion of spool 22. A washer 27 is interposed between screw 28 and spool 22. The reverse procedure would be used to remove the extension disk from the disk gang. From the foregoing it is apparent that the present disk extension mounting is compact in structure thereby presenting a maximum amount of trash clearance and a minimum amount of projections that would cause a trash problem. The disk connection is strong but if a failure should occur, it would normally strip the threads in one or more of the segments. The segments are of simple manufacture and can be easily and quickly replaced at a minimum cost without disassembling the disk gang. Attaching and detaching the disk extension can be easily accomplished without any change in the disk gang other than to loosen gang bolt 11.

It will, of course, be understood that various changes may be made in the form, details, arrangements and proportions of the parts without departing from the scope of my invention as set forth in the appended claims.

The embodiments of the invention in which an exclusive property or privilege is claimed are defined as follows:

1. A disk harrow having a disk gang comprising multiple disks, spacing spools between said disks, a spindle bolt connecting said disks and spools, a washer attached at one end of said bolt and securing means coacting with the other end of said bolt to tighten said disk and spools into frictional engagement between said means and said washer, said washer being provided with spaced openings for receiving a spanner wrench to prevent turning movement of said bolt during said tightening movement of said means, the improvement comprising means for attaching an extension to said bolt, said means including a plurality of arcuate segments positioned about said bolt between said washer and the outer of said disks, each of said segments having a threaded opening therein lying in axial alignment with one of said openings in said washer, a stud passing through said one opening and being threadably received in said segment, and means for attaching said extension unit on said stud to said washer.

2. A disk harrow extension unit as recited in claim 1 and wherein each of said segments presents a surface contacting said outer disk and said surface is complementary to the disk surface contacted.

3. A disk harrow extension unit as recited in claim 1 and wherein each of said segments having a maximum radial dimension substantially equal to that of said washer so as to provide a generally continuous surface from said outer disk to said extension disk for preventing the accumulation of trash.

4. A disk harrow extension unit as recited in claim 3 and wherein said segments are so configured and when arranged radially about said bolt said segments provide a substantially solid washer about said bolt.

References Cited

UNITED STATES PATENTS

| | | | |
|---|---|---|---|
| 1,402,590 | 1/1922 | Fossel | 172—599 |
| 2,790,367 | 4/1957 | Simmons | 172—600 |
| 2,818,008 | 12/1957 | Fulper | 172—599 X |

ABRAHAM G. STONE, *Primary Examiner.*

J. R. OAKS, *Assistant Examiner.*